Dec. 1, 1970        H. LANZENBERGER      3,543,598

DRIVING MEANS FOR VERTICAL BALL-ROLL SPINDLES

Filed Oct. 11, 1968                              2 Sheets-Sheet 2

United States Patent Office

3,543,598
Patented Dec. 1, 1970

3,543,598
DRIVING MEANS FOR VERTICAL BALL-ROLL SPINDLES
Horst Lanzenberger, Munich, Germany, assignor to Friedrich Deckel Prazisions Mechanik und Maschinenbau, Munich, Germany, a firm of Germany
Filed Oct. 11, 1968, Ser. No. 766,841
Claims priority, application Austria, Oct. 23, 1967, A 9,561/67
Int. Cl. B66f *3/08;* F16d *63/00;* F16h *1/18*
U.S. Cl. 74—424.8            7 Claims

ABSTRACT OF THE DISCLOSURE

A drive for a vertical ball-roll spindle, useful especially for a spindle for elevating a support for a worktable of a machine tool. Friction creating means is connected to the spindle by a one-way clutch, so that the friction creating means is ineffective when the spindle is turned in a direction to raise the load, but becomes effective when the spindle is turned in a direction to lower the load, thus interposing the friction necessary to prevent the spindle from being turned in a descending direction by the weight of the load. In one form of the invention, the friction creating means is associated with a drive shaft geared to the spindle, and the amount of friction varies with the load.

BACKGROUND OF THE INVENTION

In various forms of mechanism, particularly but not exclusively in machine tools, it is desired to be able to adjust a part vertically by a screw arrangement, usually by a manually turned screw, and to have the part held firmly at the adjusted elevation, when the adjustment has been completed. Also it is desired to make the adjustment as easy as possible, requiring as little manual power as possible when raising the load but at the same time there must be adequate insurance against having the load lower itself unintentionally. This applies particularly to the vertical spindles for supporting the worktables or the parts which in turn support the worktables of machine tools, such as a so-called knee which goes up and down a vertical guideway on a machine tool, the worktable itself being supported on the knee.

A vertical screw thread has frequently been employed for supporting the load in a situation of this kind. When a conventional sliding thread is used, there is enough friction so that a thread of moderate conventional pitch is self-locking; that is, the weight of the load will not cause the thread to turn in a descending direction. Therefore the load stays at the elevation to which it has been adjusted, until external force is applied to turn the threaded spindle in a descending direction. While a conventional spindle with sliding threads is satisfactory from this standpoint of preventing the load from descending by itself, it is undesirable from the standpoint that it develops considerable friction when the spindle is turned in a direction to raise the load, thus requiring additional force beyond what would otherwise be needed.

It has been proposed to use a spindle of the ball-roll type, since this has much less friction than a spindle of the sliding thread type. Because of the lower friction, a spindle of the ball-roll type can be operated to raise the load with a minimum of effort, but the friction is so low that the spindle is not self-locking. The weight of the load itself will turn the spindle in a descending direction, unless other means are used to prevent such turning.

Various solutions have been proposed to prevent the self-descent of a load supported by a ball-roll spindle, but the prior proposals are not wholly satisfactory. For example, it has been proposed to use a sliding thread spindle in parallel with the ball-roll spindle, so that the sliding thread spindle takes part of the load and will lock itself against rotation. However, as a result of manufacturing tolerances and wear of the thread, the distribution of the load between the two threads varies greatly. Moreover, the frictional braking force of the sliding thread must be overcome not only when lowering the load but also when raising it, which is useless and detrimental.

Another proposal to overcome the self-lowering difficulty is to drive the ball-roll spindle by means of a self-locking worm gearing. But this also is not satisfactory, because here again the same friction which makes the worm gearing self-locking occurs when the gearing is operated not only in the lowering direction but also in the raising direction, producing useless and undesirable friction when raising the load. The raising should be made as easy as possible, especially when dealing with heavy loads and when the spindle is to be operated manually rather than by motor power.

The difficulties of the above mentioned and other prior art arrangements are overcome according to the present invention, by providing friction-producing means such as a slip clutch or the like, effectively connected to the spindle or to its operating shaft by means of a one-way clutch (sometimes called a free-wheeling clutch) in such fashion that the spindle turns freely in a load-raising direction, without involving the friction means, but the friction means is clutched to the rotating parts and turns therewith when the parts are turned in a load-lowering direction. Thus enough friction can be produced to lock the ball-roll spindle automatically against self-descent, but this friction is completely ineffective and does not cause any drag on the operation of the spindle in a load-raising direction.

Accordingly, it is an object of the present invention to provide a generally improved and more satisfactory mechanism for raising and lowering any parts which are to be adjusted vertically, in machine tools or otherwise, which mechanism is self-locking against descent of the load without providing any frictional drag when raising the load.

Another object of the invention, more specifically, is the provision of a vertical load-bearing spindle of the ball-roll type, in combination with friction means operatively connected to the spindle by a one-way clutch so that the friction means is effective when the spindle is turned in a descending direction and is ineffective when the spindle is turned in a load-raising direction.

A further object is the provision of friction means of the above character, so designed that the extent of frictional resistance varies with the load.

BRIEF DESCRIPTION OF THE DRAWINGS

In the accompanying drawings, which are incorporated herein by reference and constitute a material part of the disclosure, and which illustrate a preferred embodiment of the invention by way of example.

DESCRIPTION OF THE PREFERRED EMBODIMENTS

Figure 1:
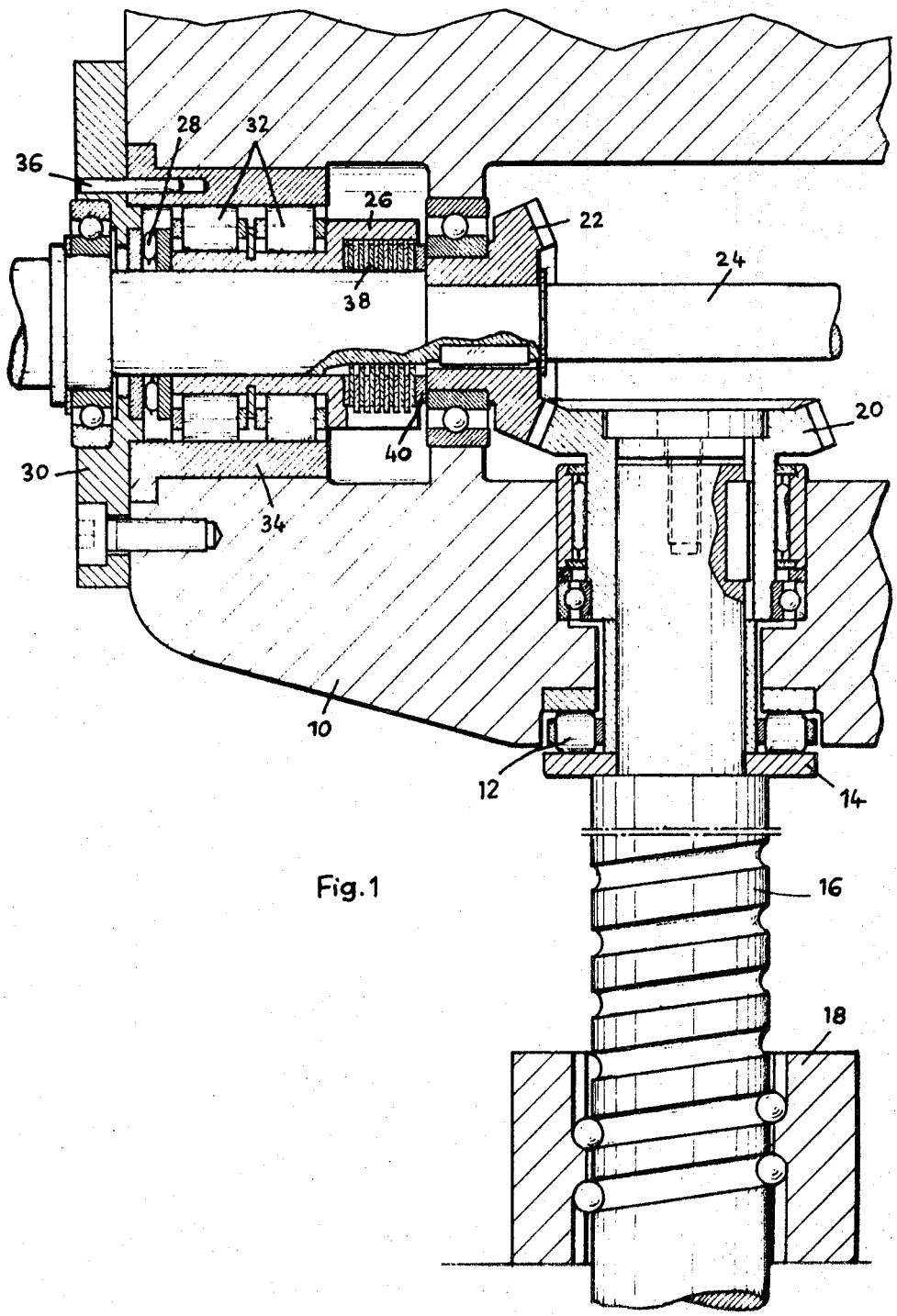
FIG. 1 is a vertical section through a fragment of a knee table of a machine tool and the vertical elevating spindle and associated parts, illustrating one form of the present invention.

Referring first to FIG. 1, there is shown at 10 a fragment of a knee movable vertically on a conventional vertical guide (not shown) of a machine of any desired kind, such as a milling machine, the knee 10 being adapted to support a worktable or other desired load. The knee rests on a bearing 12 on a flange 14 of a vertical spindle 16 of the ball-roll type, rotatable in a vertically fixed nut 18, so that by rotating the spindle 16 the knee 10 and anything carried by the knee is raised or lowered.

At its upper end the spindle 16 bears a bevel gear 20 which engages a second bevel gear 22 keyed to a drive shaft 24 which is turned in one direction or the other (preferably by a conventional manually operated handwheel or crank, not shown) to elevate or lower the knee 10. The drive shaft 24 is rotatably supported in the knee 10 and is surrounded by a sleeve 26 which is held against leftward movement by a thrust bearing 28 on a cover plate 30 held rigidly to the knee by screws. Rollers 32 roll between the outer periphery of the sleeve 26 and the inner periphery of a surrounding ring 34 which is held by pins 36 so that it cannot rotate. Either the outer periphery of sleeve 26 or the inner periphery of the ring 34, or both are sloped or tapered in a manner well understood in the art, so that the parts 26, 32, and 34 together form a one-way clutch or freewheeling clutch preventing the sleeve 26 from turning relative to the fixed ring 34 in a direction corresponding to rotating the spindle 16 to lower the knee 10, but the sleeve 26 may turn freely relative to the ring 34 in the opposite direction, corresponding to raising the knee 10.

Friction means is operatively interposed between the sleeve 26 and the shaft 24. This friction means may take various forms. Preferably it is in the form of a multi-disk brake 38 comprising a series of annular disks between the shaft and the sleeve, alternate disks being non-rotatable with respect to the shaft, and the intermediate disks being non-rotatable with respect to the sleeve.

When force is transmitted through the bevel gears 20 and 22, an axial thrust is produced in the bevel gear 22, proportional to the force transmitted. A ring 40 interposed between the bevel gear 22 and the first disk of the brake 38 serves to transmit the axial thrust produced in the bevel gear 22 to the plates of the brake 38, pressing the plates tighter together in an axial direction and thus increasing the slip torque of the coupling with an increase in the force transmitted through the bevel gears.

With this arrangement, when the shaft 24 is turned in a direction to lower the knee 10, the sleeve 26 cannot turn in the same direction and therefore slippage must occur in the friction brake 38, producing the desired friction to hold the parts against rotation sufficiently to prevent the weight of the load from turning the spindle 16 and lowering the load. When it is desired to lower the load, the shaft 24 must be turned with sufficient force to overcome the friction of the friction slip brake means 38. The slip brake is so designed and proportioned that the slip torque, or frictional resistance to turning, is somewhat greater than that which is exerted on the shaft 24 by the spindle 16 as a result of the weight of the load tending to turn the ball-roll spindle. However, when the shaft 24 is turned externally (e.g., by a handwheel) in a direction to raise the load, the one-way clutch permits the sleeve 26 to turn freely with the shaft 24, so that there is no slippage in the slip brake 38, which does not add any resistance to the turning of the shaft 24 in a load-raising direction.

Figure 2:
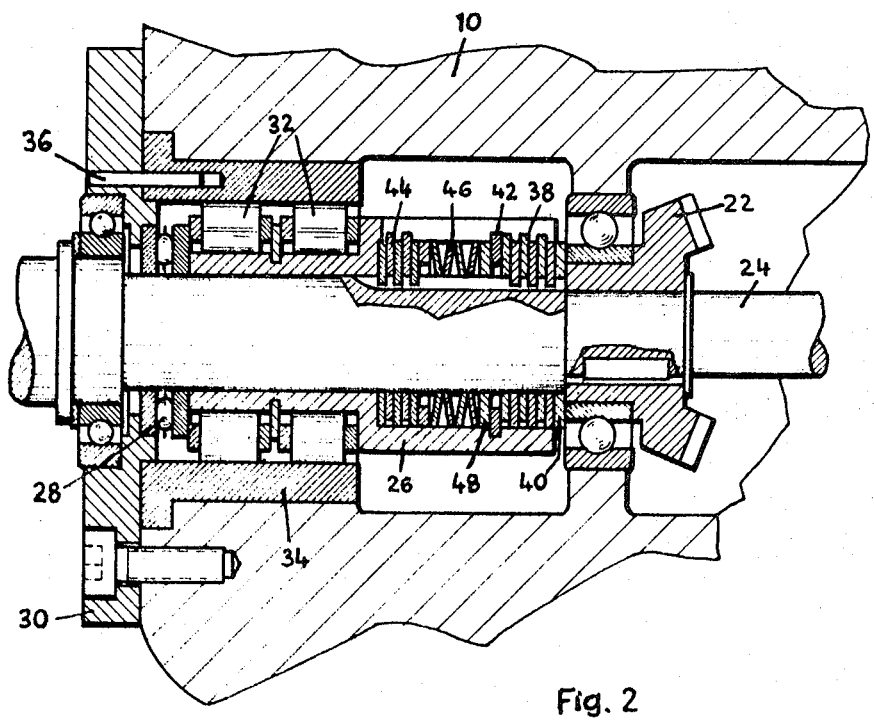
FIG. 2 is a view similar to a portion of FIG. 1, illustrating a second embodiment of the invention.

The second embodiment of the invention, illustrated in FIG. 2, differs from the first embodiment in that two separate friction means are used, one of such friction means being responsive to or varying with the weight of the load, the other friction means producing constant resistance (in the descending direction) independent of the weight of the load.

In this second embodiment, the plates of the slip brake 38 (corresponding to the slip brake 38 in the first embodiment) react against the split ring or circlip 42 seated in an annular groove extending circumferentially around the inner periphery of the enlarged portion of the sleeve 26. As before, the axial displacement of the bevel gear 22, in proportion to the torque transmitted through the bevel gears, acts through the ring 40 to press the plates 38 toward the axially stationary ring 42, thus varying the resistance of the friction means 38 in accordance with the load. The parts are so proportioned that the torque resistance of the brake 38 is equal to the torque produced on the ball-roll spindle 16 by the weight of the knee 10 and the parts supported thereby, this weight varying, of course, when different weights of work pieces are placed on the worktable and when different machining forces are applied to the work pieces.

There is also a second slip brake 44, in this embodiment of the invention, the plates of this slip brake being similarly constructed and being pressed against an axially immovable shoulder of the sleeve 26 by the plate springs 46 which react against a replaceable ring 48 which bears against the ring 42. During assembly, a thicker or thinner ring 48 may be inserted, to produce greater or less axial pressure on the plate springs 46 against the brake plates 44, to vary the resistance or frictional drag produced by the brake plates 44. The resistance produced by the plates 44 is constant, and is in addition to the variable resistance produced by the brake plates 38, which varies with the load.

In this embodiment, as in the previous one, the rollers 32 constitute clamping elements (arranged in two rows, just as in the first embodiment) which, in combination with the sleeve 26 and the ring 34, form a one-way or free wheeling clutch, allowing the sleeve 26 to turn freely with the shaft 24 when the latter is turned in a direction to raise the load, but preventing the sleeve 26 from turning with the shaft when the shaft turns in the opposite direction, to lower the load.

What is claimed is:

1. The combination with a vertical spindle of the ball-roll type for supporting a load, such as a machine tool part, at an adjustable elevation, of a drive shaft geared to said spindle and adapted to be turned to turn the spindle with it, frictional drag means surrounding said drive shaft, and one-way clutch means operatively interposed between said drive shaft and said frictional drag means for operatively connecting said drive shaft to said frictional drag means when said drive shaft is turned in a direction to turn said spindle in a load-descending direction, said one-way clutch means being arranged to allow free-wheeling rotation of said drive shaft in a load-raising direction without resistance from said frictional drag means.

2. A construction as defined in claim 1, further including a sleeve rotatably mounted on and surrounding said drive shaft, and a non-rotary part surrounding said sleeve, said frictional drag means being interposed between said sleeve and said drive shaft, said one-way clutch means being interposed between said sleeve and said non-rotary part.

3. A construction as defined in claim 2, wherein the gearing between said drive shaft and said spindle causes axial displacement of said drive shaft in accordance with variations in the degree of torque transmitted between said spindle and said drive shaft, and wherein said frictional drag means produces a variable frictional drag dependent upon the axial displacement of said drive shaft.

4. A construction as defined in claim 3, further including other frictional drag means also interposed between said sleeve and said drive shaft for producing additional resistance of constant amount independent of axial displacement of said drive shaft.

5. A construction as defined in claim 4, in which said other frictional drag means is in the form of a spring-loaded slip brake.

6. A construction as defined in claim 1, wherein said frictional drag means comprises a multiple disk slip brake having a variable rotary resistance depending on axial pressure exerted on said slip brake, and means for varying the axial pressure exerted on said brake in accordance with variations in the load carried by said spindle.

7. A construction as defined in claim 1, wherein said frictional drag means includes a first rotation-resisting assembly producing a variable resistance dependent upon variations in the load carried by said spindle, and a second rotation-resisting assembly producing a constant resistance independent of variations in the load carried by said spindle.

References Cited
UNITED STATES PATENTS

| | | | |
|---|---|---|---|
| 2,659,466 | 11/1953 | Ochtman | 254—103 X |
| 2,876,990 | 3/1959 | Grabowski | 188—82.1 X |
| 3,033,522 | 5/1962 | McKay | 254—103 X |
| 3,436,994 | 4/1969 | Diener et al. | 74—424.8 X |

LEONARD H. GERIN, Primary Examiner

U.S. Cl. X.R.

74—411.5; 188—82.1; 254—98, 103